(12) United States Patent
Merman et al.

(10) Patent No.: US 6,848,050 B1
(45) Date of Patent: Jan. 25, 2005

(54) SYSTEM AND METHOD FOR ALTERNATIVE ENCRYPTION TECHNIQUES

(75) Inventors: Michael Merman, Santa Monica, CA (US); Yosif Smushkovich, Santa Monica, CA (US)

(73) Assignee: Citicorp Development Center, Inc., Los Angeles, CA (US)

(*) Notice: Subject to any disclaimer, the term of this patent is extended or adjusted under 35 U.S.C. 154(b) by 0 days.

(21) Appl. No.: 09/292,718

(22) Filed: Apr. 15, 1999

Related U.S. Application Data

(60) Provisional application No. 60/081,905, filed on Apr. 16, 1998.

(51) Int. Cl.⁷ .................................................. H04K 1/00
(52) U.S. Cl. ....................... 713/171; 713/184; 380/259; 380/262; 380/268; 380/283; 380/44; 380/28; 705/66; 705/67; 705/72
(58) Field of Search .................................. 380/259, 262, 380/268, 283, 44, 28; 705/66, 67, 72; 713/171, 184

(56) References Cited

U.S. PATENT DOCUMENTS

| | | | |
|---|---|---|---|
| 4,200,770 A | 4/1980 | Hellman et al. | 178/22 |
| 4,650,975 A | 3/1987 | Kitchener | 235/375 |
| 4,661,658 A | 4/1987 | Matyas | 380/23 |
| 4,933,971 A | 6/1990 | Bestock et al. | 380/44 |
| 5,200,999 A | 4/1993 | Matyas et al. | 380/25 |
| 5,241,599 A | 8/1993 | Bellovin et al. | 380/21 |
| 5,347,580 A | 9/1994 | Molva et al. | 380/25 |
| 5,448,638 A | 9/1995 | Johnson et al. | 380/23 |
| 5,659,616 A | 8/1997 | Sudia | 380/23 |
| 5,757,918 A | 5/1998 | Hopkins | 380/25 |
| 6,047,269 A * | 4/2000 | Biffar | 705/39 |
| 6,052,469 A * | 4/2000 | Johnson et al. | 380/26 |

OTHER PUBLICATIONS

David P. Jablon: "Extended Password Key Exchange Protocols Immune to Dictionary Attack," Proceedings of the Sixth Workshops on Enabliong Technologies: Infrastructure for Collaborative Engineering (WETICE '97 Enterprise Security), IEEE Computer Society, Ca.*

Seungjoo Kim, et al., "Comments on Password–Based Private Key Download Protocol of NDSS '99," Electronics Letters, Oct. 28, 1999, vol. 35, No. 22, pp. 1937–1938.*

Thomas Wu et al. "The Secure Remote password Protocol," Nov. 11, 1997, Published in : "1998 Internet Society Symposium on Network and Distributed System Security".*

Bellovin and Merritt: "Encrypted Key Exchange: Password–Based Protocols Secure Against Dictionary Attack," Proceedings of the IEEE Symposium on Research in Security and Privacy, Oakland, May 1992.*

David P. Jablon: "Strong Password–Only Authenticated Key Exchange," Mar. 2, 1997, http://www.integritysciences.com, (Earlier Version Published in ACM Computer Communication Review, vol. 26, No. 5, Oct. 1996).*

(List continued on next page.)

*Primary Examiner*—Gregory Morse
*Assistant Examiner*—Paul Callahan
(74) *Attorney, Agent, or Firm*—George T. Marcou; Kilpatrick Stockton LLP

(57) ABSTRACT

A system and method for verifying the identification of a user and securely establishing an encryption key for a communication between the user and a verifying entity, such as a bank, which makes use of the numeric value of the user's personal identification number (PIN) known only to the user and the bank and resolves the man-in-the-middle problem. The system and method replaces a public parameter with the customer's PIN to provide an encryption mechanism that is less complex than existing protocols. Use of the protocol enables new products and improvement of existing products using a service access device and service access device interface, including, for example, self-service terminals.

46 Claims, 5 Drawing Sheets

OTHER PUBLICATIONS

"Privacy and Authentication: An Introduction to Cryptography)," Withfield Diffie and Martin E. Hellman, IEEE, vol. 67, No. 3, Mar., 1979.

"Applied Cryptography," B. Schneier, John Wiley & Sons, p. 466, 1966.

"Applied Cryptography," B. Schneier, John Wiley & Sons, p. 48, 1996.

"Applied Cryptography," B. Schneier, John Wiley & Sons, p. 518, 1996.

"Contemporary Cryptography," Gustavus J. Simmons, IEEE Press, 1992.

"Art of Computer Programming," Donald Knuth, Addison & Wesley, vol. 1, 1973.

"Art of Computer Programming," Donald Knuth, Addison & Wesley, vol. 2, 1973.

"Handbook of Mathematical Functions," National Bureau of Standards, p. 826, 1964.

European Search Report for European Application No. EP 99201145, dated Jul. 28, 2003, pp. 1–3.

"Applied Cryptography, Algorithms and Source Code in C", B. Schneider, John Wiley & Sons, 1996, pp. 516–517.

"Applied Cryptography, Algorithms and Source Code in C", B. Schneider, John Wiley & Sons, 1996, p. 48.

"Strong Password–Only Authenticated Key Exchange", Computer Communication Review, D. Jablon, Sep. 25, 1996, vol. 26, No. 5, pp. 5–16.

"Strong Password–Only Authenticated Key Exchange", D. Jablon, www.integritysciences.com, Mar. 2, 1997, pp. 1–24.

* cited by examiner

SYSTEM AND METHOD FOR ALTERNATIVE ENCRYPTION TECHNIQUES

CROSS REFERENCE TO RELATED APPLICATIONS

The application claims the benefit of U.S. Provisional Application No. 60/081,905 filed Apr. 16, 1998.

FIELD OF THE INVENTION

The present invention relates to alternative encryption techniques, and more particularly to a system and method for securely communicating information between parties in a transaction.

BACKGROUND OF THE INVENTION

Current encryption methods for communicating information between parties require that the communicating parties are able to recognize each other aside from the encrypted message. In other words, the communicating parties need to be able to verify that they are truly communicating with whom they think they are communicating. Often, current systems rely on Certification Authorities (CA's) to verify the identity of each party and to transfer secret keys to encode communications. Use of third parties to verify identities, however, presents a "man-in-the-middle" problem, whereby the man in the middle has access to secret information in the clear.

Limitations of the current system include aspects of public key cryptography and the man-in-the-middle problem. The current system was designed as a general-purpose system in which the personal identification number (PIN) that is to be protected is given no more consideration than any other message. In such systems, secret keys must be initialized for all devices that participate in a communication. Procedures for initializing and distributing the keys are part of a key management system, which is also responsible for physically securing the keys.

The initialization procedure is a highly secretive one and relies on a master key at the top of a hierarchy. This procedure requires a special, secure environment and entrusted officers to perform the procedure. These requirements present a logistical problem, because the initialization must be done on every peripheral that handles the PIN. For these reasons, the PIN is not protected, for example, in home banking, as it is in automated teller machines (ATMs). Nor is such protection extended to other services provided by peripherals that are not readily accessible.

Even with all precautions, such a system cannot ensure complete secrecy and security. Between an input device, for example, where a customer enters her PIN and the bank system where the PIN is verified, a number of intermediate systems are involved. By necessity, the involvement of these intermediate systems results in the sharing of the secret keys on the borders of each of these systems' control or "jurisdiction." In sharing the secret keys and responsibilities, these intermediate systems present a security problem, because the PIN is decrypted with one key and encrypted again with another and appears in the clear.

In summary, the current system is expensive and yet inadequate in both logistics and security. Proposals to simplify the logistics of the key initialization procedure by using public key cryptography address one problem, namely, the initialization of system keys and introduces another problem of the same nature, namely, the initialization of public keys. These problems persist as long as the system is a general purpose one in which the PIN is not given special consideration and the prior knowledge of the communicating parties is ignored. However, even if such proposals to simplify the logistics were implemented, the system would remain fragmented and would not be an end-to-end system.

SUMMARY OF THE INVENTION

It is a feature and advantage of the present invention to provide an encryption mechanism that eliminates the need for secret keys, and consequently, the need of initialization and management of the secrecy of secret keys.

It is another feature and advantage of the present invention to provide an encryption mechanism which excludes the need for intermediate system devices by establishing a personalized customer key directly between the customer and the bank's verification site.

It is a further feature and advantage of the present invention to provide an encryption mechanism that improves personal identification number protection with end-to-end encryption.

It is an additional feature and advantage of the present invention to provide an encryption mechanism that reduces the cost of security, for example, by minimizing the need for a key management system and physically secure devices.

It is a still further feature and advantage of the present invention to provide an encryption mechanism that removes the logistical limitations of current encryption systems to provide a secure access for home banking and other terminals.

It is still another feature and advantage of the present invention to provide an encryption mechanism that simplifies the handling of smart cards and stimulates their use in combined smart-ATM cards for dual cash and electronic requirements.

To achieve the stated and other features, advantages and objects of the present invention, an embodiment of the present invention provides a system and method of verifying identification of a user and securely establishing an encryption key for a communication between the user at a customer device (CD) and the verifying device (VD) of a verifying entity, such as a bank, utilizing the user's PIN. The customer's PIN is a first secret known to the verifying entity or bank and a second secret known to the user. The terms "first secret" and "second secret" distinguish the knowledge of the customer's PIN by the verifying entity or bank (first secret) from the knowledge of the customer's PIN by the user (second secret). The user at the CD enters the user's account number, which is sent to the VD of the bank. The VD retrieves the user's PIN, as well as a pre-established prime number for the user based on the user's account number. The VD then generates a first random number, as well as a first output, which is a function of the first secret and the first random number, and sends it to the CD. The CD generates and sends a second random number, as well as a second output for the user, which is a function of the second secret and the second random number. The CD further generates and sends a first key for the user, which is a transform of the first output that is infeasible to invert without the first secret and the second secret.

In an embodiment of the present invention, the VD generates and sends a second key, which is a transform of the second output that is infeasible to invert without the first secret and the second secret. The CD generates and sends a first encrypted output for the user, which is a function of the first secret and the first key. The VD then generates a first verification value by decrypting the first encrypted output with the second key that indicates the equivalence of the first secret to the second secret to the verifying device. The VD also generates and sends a second encrypted output which is a function of the second key and one of either the first decrypted number, if the first decrypted number is equal to both of the first and second secrets, and a random number. The CD generates a second verification value which is the second encrypted output decrypted by the CD using the first key that indicates the equivalence of the first secret to the second secret and the first key to the second key. The second verification value is a second decrypted number that is equal to both of the first and second secrets only if the first secret is equal to the second secret. The system and method of the present invention provides a mechanism for establishing a secure session key between the user and the verifying entity or bank.

The secure encryption mechanism provided by the present invention enables the development and enhancement of a number of hardware devices and software applications, such as a service access device (SAD), which is a remote control for self service, home banking, and other terminals equipped with a service access device interface. Such uses include, for example, smart-automated teller machine cards, automated teller machines, self-service terminals, self-service cash terminals, self-service gas pump terminals, home banking terminals, electronic commerce terminals, smartcard terminals, merchant terminals, and infrared compatible terminals.

Additional objects, advantages and novel features of the invention will be set forth in part in the description that follows, and in part will become more apparent to those skilled in the art upon examination of the following, or may be learned by practicing the invention.

DETAILED DESCRIPTION

Figure 1:
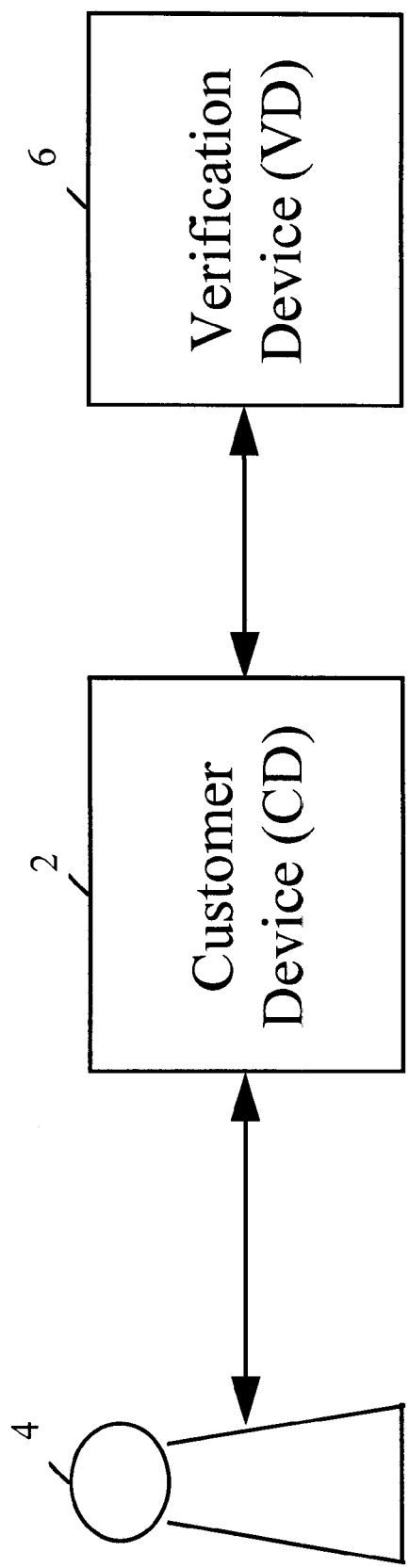
FIG. 1 is an overview of key components and the flow of information between the key components for an embodiment of the present invention.

Referring now in detail to an embodiment of the invention, an example of which is illustrated in the accompanying drawings, the present invention provides an alternative encryption technique for use, for example, in new products and services, and to improve existing products and services, of a financial institution such as a bank. The system and method of the present invention makes use of the PIN in an alternative encryption technique, referred to herein as the PIN Protected Key Establishing Protocol (PPKE), for secure customer-bank communications. The PIN is used in combination with elements of public key cryptography to create an encryption mechanism that eliminates the system secret keys and, and consequently, the need for initialization and secrecy of secret keys. The mechanism for an embodiment of the present invention excludes intermediate system devices by establishing a personalized customer key directly between the customer and the bank's verification site.

In an embodiment of the present invention, PPKE improves PIN protection by providing end-to-end encryption. In addition, PPKE reduces the cost of security, in that it eliminates the need for a key management system and physically secure devices. Further, PPKE removes the logistical limitations of the current encryption system to provide secure access for home banking and other remote terminals. Additionally, PPKE simplifies the handling of smart cards and stimulates their use in combined smart-ATM cards for dual cash and electronic transactions.

Public key cryptography is said to have been invented by Diffie and Hellman, who introduced their key exchange algorithm in 1976. See Withfield Diffie and Martin E. Hellman, "Privacy and Authentication: An Introduction to Cryptography", IEEE vol. 67, No. 3, March 1979, which is incorporated herein by reference. Diffie-Hellman (DH) allows the communicating parties to establish a secret key by exchanging its public, sent-in-the-clear components, a method that is impossible in traditional cryptography. DH is a symmetrical algorithm in that it utilizes an established key for both encryption and decryption by some other algorithm such as the Data Encryption Standard (DES).

The Diffie-Hellman (DH) algorithm is based on the commutative law of exponent function:

$$(a^X)^Y = (a^Y)^X = a^{(XY)}; \quad (1)$$

and for a discrete case:

$$(a^X \bmod p)^Y \bmod p = (a^Y \bmod p)^X \bmod p = a^{(XY)} \bmod p; \quad (2)$$

where a is an integer and p is a prime.

In a more convenient form:

$$(a^X \bmod p)^Y \bmod p = a^{(XY)} \bmod p; \quad (3)$$

$$(a^Y \bmod p)^X \bmod p = a^{(XY)} \bmod p; \quad (4)$$

Equality of the right parts of equations (3) and (4) is the central point of the algorithm. If computation (3) is done by one of the communicating parties and computation (4) by the other, both have the same result, which is $K = a^{(XY)}$ mod p. This is the secret key. It requires the knowledge of both X and Y to compute. Further, if X and Y are numbers picked by the parties at random, so that each party knows its respective number exclusively and we compute:

$$A = a^X \bmod p; \quad (5)$$

$$B = a^Y \bmod p; \quad (6)$$

then the communicating parties can exchange the results A and B in the clear. This is possible because reverse computation of X or Y from equations (5) and (6) with sufficiently large X and Y is economically impractical. These are so-called discrete exponent one-way functions. Let us now present the DH algorithm in a more formal way.

p—large prime integer a—generator, an integer that is "suitable" to p.

For the procedure to ensure this requirement, see X9.42-ANSI Diffie-Hellman National Standard, Draft, 1996, p 1258, which is incorporated herein by reference.

p and a are in the public domain

Alice and Bob want to establish a secret key K for their communications.

Alice:

generates a random number $X$     (7)

computes and sends $A=a^X \bmod p$     (8)

Bob:

generates a random number $Y$     (9)

computes and sends $B=a^Y \bmod p$     (10)

Alice:

computes $K=B^X \bmod p$     (11)

Bob:

computes $K=A^Y \bmod p$     (12)

End of procedure.

At about the same time that the DH algorithm was introduced, Rivest, Shamir and Adleman independently introduced an asymmetric algorithm, known as RSA, which has become the defacto world standard. With RSA, each communicating party produces a pair of keys. One key of the pair is public, which can be known to anyone who wants to know, and the other key of the pair is private or secret. The encryption-decryption mechanism is specific to the RSA algorithm. The sender encrypts the sender's message with the receiver's public key and the receiver decrypts the cryptogram with the receiver's private key.

The strength of both DH and RSA is based on the difficulties of reverse computation of discrete exponent function and, for the RSA ciphering mechanism, the factorization of large numbers. Although they are strong as algorithms, DH, RSA, and all other public algorithms have a common weakness. The weakness of such algorithms is the so-called man-in-the-middle problem. This problem occurs when a third, illegitimate party (C) intervenes in a communication between the legitimate parties (A and B), and plays as B for A and as A for B. If A and B cannot recognize each other independently from the communication between them, C can read and even alter the secret messages, leaving A and B unaware of the problem.

RSA addresses this issue by modifying the meaning of public key to be a publicly notarized or publicly certified key. This makes the communication more complex, and instead of solving the problem, merely moves the problem elsewhere. In the RSA approach, the sender requests the receiver's public key from a Certification Agency (CA) before sending a message. Therefore, the man-in-the-middle problem is simply moved to the communication between the sender and the CA to request the public key, and to the communication between the receiver and the CA in the public key certification process.

As established, this procedure needs protection from the middle. One method of protection is provided by the Encrypted Key Exchange (EKE) protocol introduced by Bellovin & Merritt. The EKE uses PIN as the key in a DES encryption. For an isolated case, PIN would be too short, but it works in a mix with public key encryption. The EKE can be implemented with either DH or RSA algorithms. However, RSA requires certification of the public keys, which defeats the purpose of abolishing such procedures or slows down the process with the laborious creation of public keys on the fly.

The following example is the DH version of the EKE for an exchange between a customer device where the customer enters the PIN (represented by CD) and the bank verification device (represented by VD). In this example and others, expressions like $E_K(B)$ mean encryption of B with the key K in a traditional encryption mechanism such as DES, and expressions like $D_K(C)$ mean respective decryption.

a and p are system parameters

CD:

sends Customer Account Number     (BM1)

VD:

finds customer PIN     (BM2)

generates random $X$     (BM3)

computes and sends $A=a^X \bmod p$     (BM4)

CD:

generates a random number $Y$     (BM5)

computes $B=a^Y \bmod p$     (BM6)

encrypts B with PIN as the key $C=E_{PIN}(B)$     (BM7)

computes $K=A^Y \bmod p$     (BM8)

generates a random string $R_1$     (BM9)

encrypts $R_1$ with K as the key $F=E_K$     (BM10)

sends C and F     (BM11)

VD:

decrypts B with PIN as the key $B=D_{PIN}(C)$     (BM12)

computes $K=B^X \bmod p$     (BM13)

decrypts $R_1$ with K as the key $R_1=D_K(F)$     (BM14)

generates random string $R_2$     (BM15)

concatenates $RR=R_1R_2$     (BM16)

encrypts RR with K as the key and sends $G=E_K(RR)$     (BM17)

CD:

decrypts G with K as the key $RR=D_K(G)$     (BM18)

recognizes $R_1$ in RR extracts $R_2$     (BM19)

if not—verification fails, end of procedure encrypts $R_1$ with K as the key and sends $H=E_K(R_2)$     (BM20)

VD:

decrypts H with $KR_3=D_K(H)$     (BM21)

if $R_2$ is not equal $R_3$ verification fails, end of procedure     (BM22)

else verification OK, end of procedure.     (BM23)

Now CD and VD may communicate with the session key K.

It is important to note that the man-in-the-middle is not always an intruder. For example, in electronic commerce, as the term is used herein, the merchant is in the middle by design. In other words, the merchant facilitates the communication between the customer and the bank. Placing the merchant in this position is safe only if what the man-in-the-middle knows is under the firm control of the encryption protocol. The only way to establish a key for parties that want to communicate secretly is to ensure that the parties are able to recognize each other independently from the communication. This is true for traditional, as well as for public key cryptography.

The system and method for an embodiment of the present invention provides secure communication between parties by assuring that a party in a transaction, such as a bank, is able to recognize another party, such as a customer, independent from the communication. A distinctive feature of a communication between a customer and a bank is that the bank has a way of recognizing the customer independently from the communication process. This way of recognition is based on the knowledge of the customer's PIN by both parties to the communication. The procedure for initializing or assigning a PIN to a customer is well established and presumed to be safe and reliable.

Because the PIN is a number the customer typically must memorize, the PIN cannot be long enough to be considered as the key in a stand-alone encryption process. However, in a public key-establishing exchange, such as DH, the PIN can be used in an auxiliary way to protect the exchange from the man-in-the-middle factor. Thus, such an exchange is referred to herein as the PIN Protected Key Establishing Protocol or PPKE. An embodiment of the present invention provides a protocol that is less complex than the EKE, which is referred to herein as the Modified DH PIN Protected Key Establishing Protocol (MDH PPKE).

In an embodiment of the present invention, the MDH PPKE is a simple proposition. It is in DH algorithm to replace the public parameter a, the generator, with PIN, the numeric value of the customer's PIN, which is known only to the communicating parties. In the PIN initialization procedure, each customer is assigned a prime number p, which satisfies the suitability requirement described in X9.42-ANSI Diffie-Hellman National Standard, Draft, 1996, p 1258 and is stored along with the PIN in a database. With this replacement, the man-in-the-middle has to resolve functions (C4) and (C6), which are shown below. The (C4) and (C6) functions have two unknowns, and these functions are as strong as one-way functions as are the reputable functions (5) and (6), which have a single unknown variable.

The following example is an exchange, for an embodiment of the present invention, between a device where the customer enters the PIN (represented by CD) and the bank verification device (represented by VD). As noted, expressions such as $E_K(B)$ mean encryption of B with the same key K as a traditional encryption mechanism such as DES, and expressions such as $D_K(C)$ mean respective decryption.

CD:

sends Customer Account Number (C1)

VD:

finds customer PIN and prime $p$ (C2)

generates random $X$ (C3)

computes and sends $A=PIN^X \bmod p$ (C4)

CD:

generates a random number $Y$ (C5)

computes $B=PIN^Y \bmod p$ (C6)

computes $K=A^Y \bmod p$ (C7)

pads PIN with a random number $R$: $C=PIN, R$ (C8)

encrypts $C$ with $K$ as the key: $F=E_K(C)$ (C9)

sends $B$ and $F$ (C10)

VD:

computes $K=B^X \bmod p$ (C10)

decrypts $F$ with $K$: $C=D_K(F)$ if PIN is not recognized in $C$ (C11)

generates random $M$ (C12)

else pads PIN with a random number $r$: $M=PIN, r$ (C13)

encrypts $M$ with $K$ as the key and sends $N=E_K(M)$ (C14)

CD:

decrypts $N$ with $K$: $M=D_K(N)$ (C15)

if PIN is recognized in $M$ verification OK (C16)

else verification false (C17)

end of procedure (C18)

Now CD and VD may communicate with the session key K.

Figure 2:
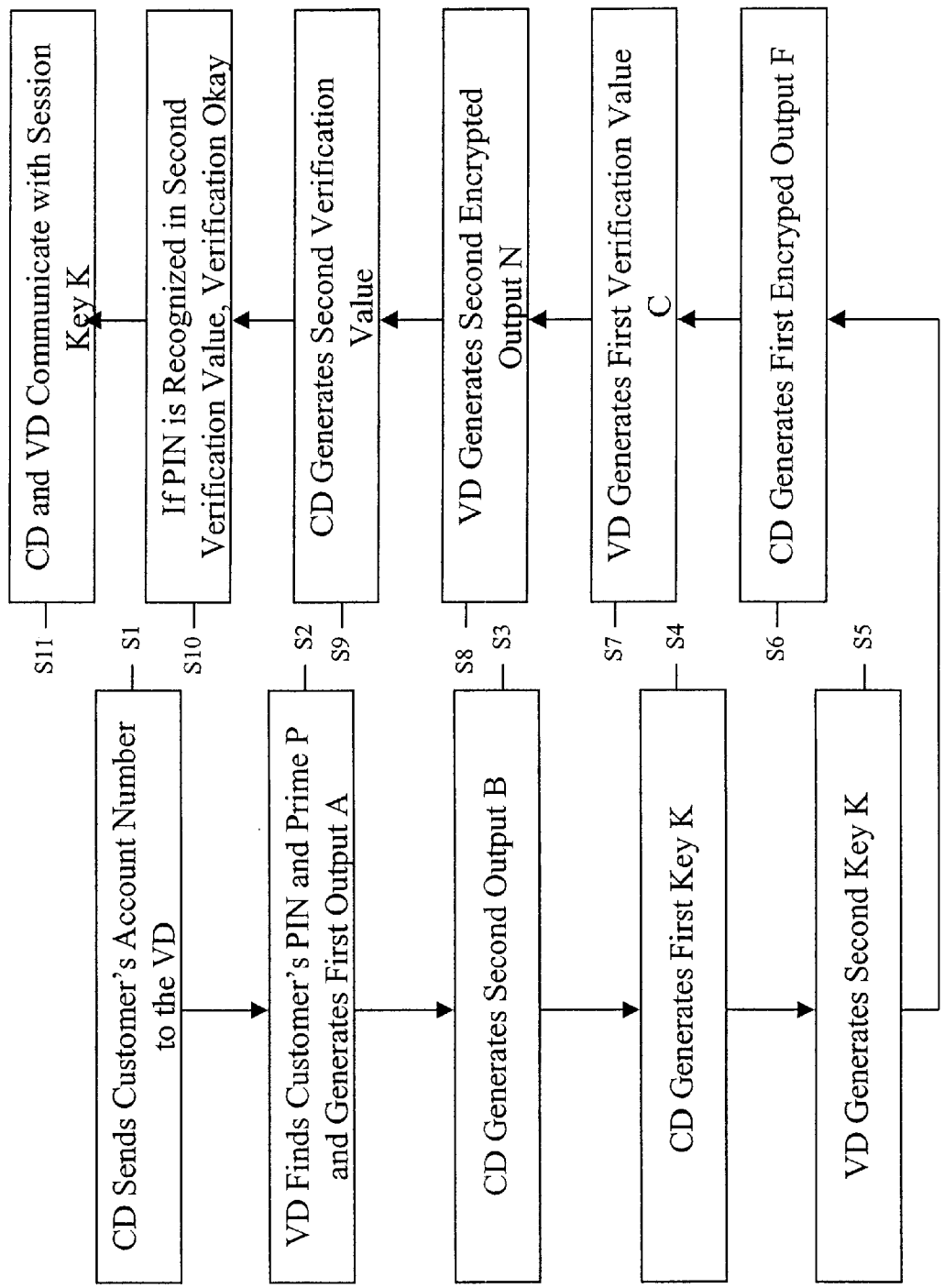
FIG. 2 is a flow chart which amplifies the flow of information shown in FIG. 1 and provides further detail regarding the process of the exchange between the device where the customer enters the customer's account number and the bank's verification device for an embodiment of the present invention.

FIG. 1 is an overview of key components and the flow of information between the key components for an embodiment of the present invention. FIG. 2 is a flow chart which amplifies the flow of information shown in FIG. 1 and provides further detail regarding the process of the exchange between the device (CD) 2 where the customer 4 enters the customer's account number and the bank's verification device (VD) 6 for an embodiment of the present invention. The numeric value of the customer's PIN is a first secret known to the bank and a second secret known to customer 4, and in the initialization process, the customer 4 was assigned a prime number p, which satisfies the suitability requirement described in X9.42-ANSI Diffie-Hellman National Standard, Draft, 1996, p. 1258, incorporated herein by reference, and which was stored along with the customer's PIN in a database by the bank. At S1, the CD 2 sends the customer's account number to the VD 6. At S2, the VD 6 finds the customer's PIN and prime number p and generates a first output A, which is a function of the first secret or PIN and a first random number X. At S3, the CD 2 generates a second output B which is a function of the second secret or PIN and a second random number Y. At S4, the CD 2 generates a first key K that is a transform of the first output A and that is infeasible to invert without the first secret and the second secret.

Referring further to FIG. 2, at S5, the VD 6 generates a second key K that is a transform of the second output B and which is infeasible to invert without the first secret and the second secret. At S6, the CD 2 generates a first encrypted output F that is a function of the first secret and the first key. At S7, the VD 6 generates a first verification value C by decrypting the first encrypted output F with the second key that indicates the equivalence of the first secret to the second secret to the VD. The first verification value C is a first decrypted number that is equal to both the first secret and the second secret only if the first secret is equal to the second secret.

Referring again to FIG. 2, at S8, the VD 6 generates a second encrypted output N that is a function of the second key and one of either the first decrypted number, if the first decrypted number is equal to both of the first secret and the second secret, and a random number r. At S9, the CD 2 generates a second verification value that is the second encrypted output N decrypted by the CD using the first key K and that indicates the equivalence of the first secret to the second secret and the first key to the second key to the CD. The second verification value is a second decrypted number that is equal to both of the first secret and the second secret only if the first secret is equal to the second secret. At S10, if PIN is recognized in the second verification value, the verification is okay, and the CD 2 and VD 6 can communicate with one another with the session key K at S11.

Unlike the existing protocol, where VD sends the result of verification in the clear as Yes/No or True/False, the above encrypted key exchange of an embodiment of the present invention does better by providing an encrypted form of confirmation. Because functions (C4) (i.e., the first output A) and (C6) (i.e., the second output B) have two unknowns that are at least as strong as the reputable functions (5) and (6), which have a single unknown, the encrypted key exchange of the present invention is safe and is a valid alternative to the existing EKE solution.

Figure 3:
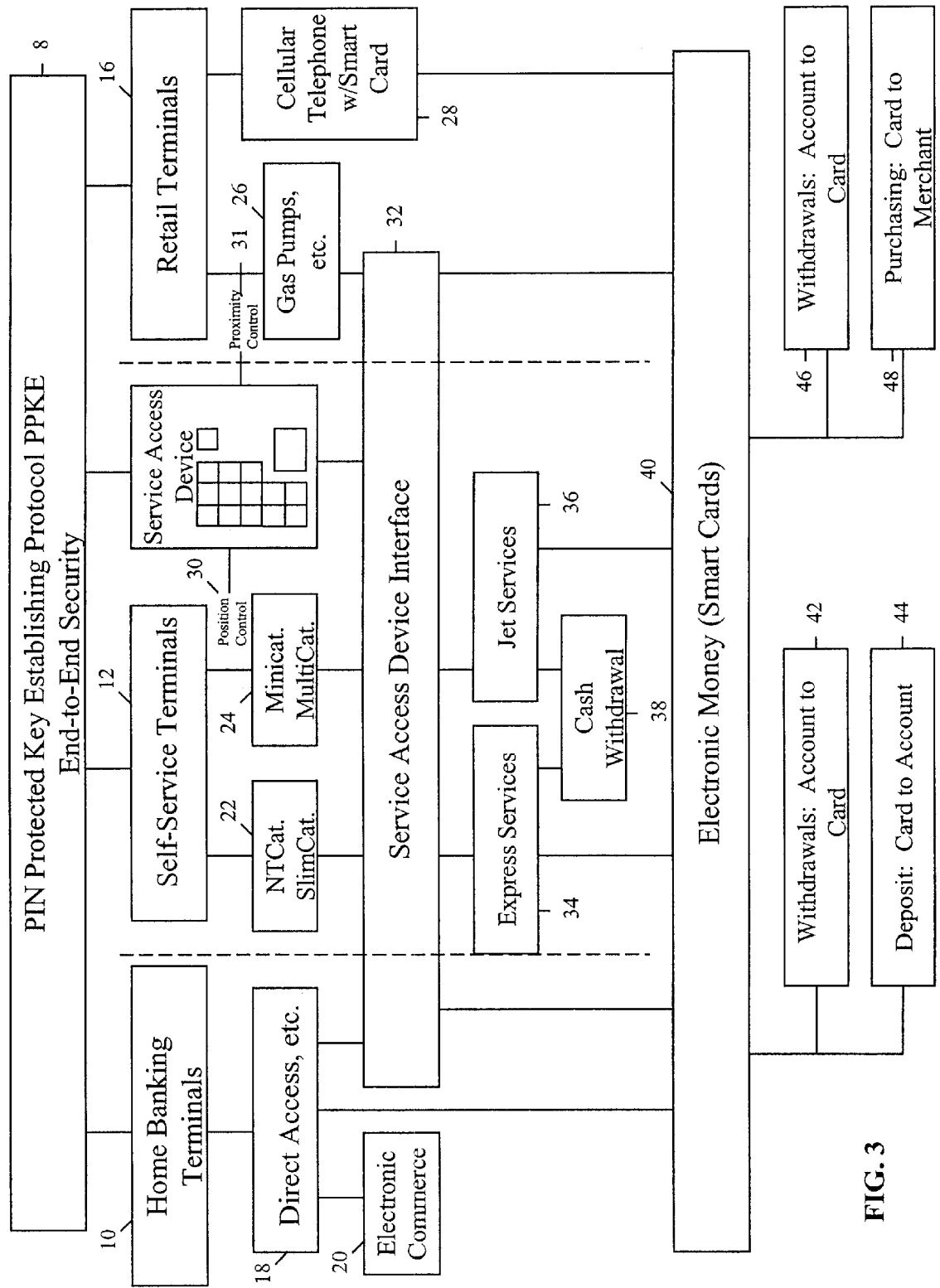
FIG. 3 is a chart which illustrates examples of new and improved hardware devices and software applications using the alternative encryption technique for an embodiment of the present invention.

The alternate encryption technique, PPKE, for an embodiment of the present invention enables, for example, a line of new products and the improvement of existing products and services of a financial institution, such as a bank. For example, PPKE enables the development and enhancement of a number of hardware devices and software applications. FIG. 3 is a chart which illustrates examples of new and improved hardware devices and software applications using the alternative encryption technique for an embodiment of the present invention.

Such devices include, for example, a service access device (SAD) 14, which is a remote control for self-service, home banking, and other terminals equipped with a SAD interface 32. The SAD 14 is a pocket-sized, low-cost device incorporating a combined smart-ATM card 40. The SAD 14 has a number of features, including, for example, one-button operation for basic services, such as cash withdrawal and the smart card operations of loading and discharging electronic money. Another aspect of the SAD 14 is biometric user recognition. An additional feature of the SAD 14 is ease of use, particularly for handicapped and disabled ATM users. Such ease of use aspects include, for example, terminal position control 30 and proximity control 31, which lets a customer access a function without precise contact with a particular peripheral device, as well as limited interaction with the ATM.

In an embodiment of the present invention, the SAD interface 32 is also incorporated into existing self-service terminals to provide, Express Cash withdrawals 34 and Express Card loading from and discharge of electronic money to the customer's account (as withdrawals and deposits). An embodiment of the present invention also includes MiniCAT customer access terminal 24, a new class of self-service, limited-function terminal controlled by the SAD 14. This low-cost, small footprint (no Touch Screen, no Card Reader, and no Depositor) terminal provides Jet Cash withdrawals 38 and Jet Card smart card loading (withdrawals) and discharge (deposit).

In addition, an embodiment of the present invention includes MultiCAT 24, a composition of a few MiniCAT's 24 that share engine resources. Further, an embodiment of the present invention includes home banking 10 for secure home banking 10, electronic commerce 18 with customer and merchant options, and smart card operations 40, such as loading 42 and discharge 44 of electronic money. Still further, an embodiment of the present invention includes SAD alliances with other businesses, such as cellular telephone with smart card interface 28 to provide loading capability, and gas pumps 26, such as remote control pumps, to provide security and remote control of pumping equipment where it might be useful.

In addition to enhancing communication in logistics and security, the PPKE for an embodiment of the present invention simplifies handling, for example, of smart cards in a significant way. The PPKE abolishes secret keys and their initialization procedure for all participating devices, including smart cards. In the PPKE environment, smart card operations include, for example, loading the cards with electronic money in cases where these operations are currently limited to purchasing or discharge. By offering smart cards protected by the PPKE, a financial institution, such as a bank, attracts new customers and has a competitive edge in building alliances with other businesses in their area of service, such as gas pumps, cellular telephones, and the like.

In an embodiment of the present invention, the PPKE is utilized for implementing the secure access device or SAD 14 that provides smart card loading and discharge. The SAD 14 is a portable, pocket-sized, remote control device for self-service, home banking, and other terminals that may benefit from the simple and direct transactions that are provided by the device. It is assumed that communications between the SAD 14 and the terminal can be intercepted. However, this does not present a problem because the PPKE protects such communications. Therefore, all SAD-controlled terminals are covered by the PPKE.

Figure 4:
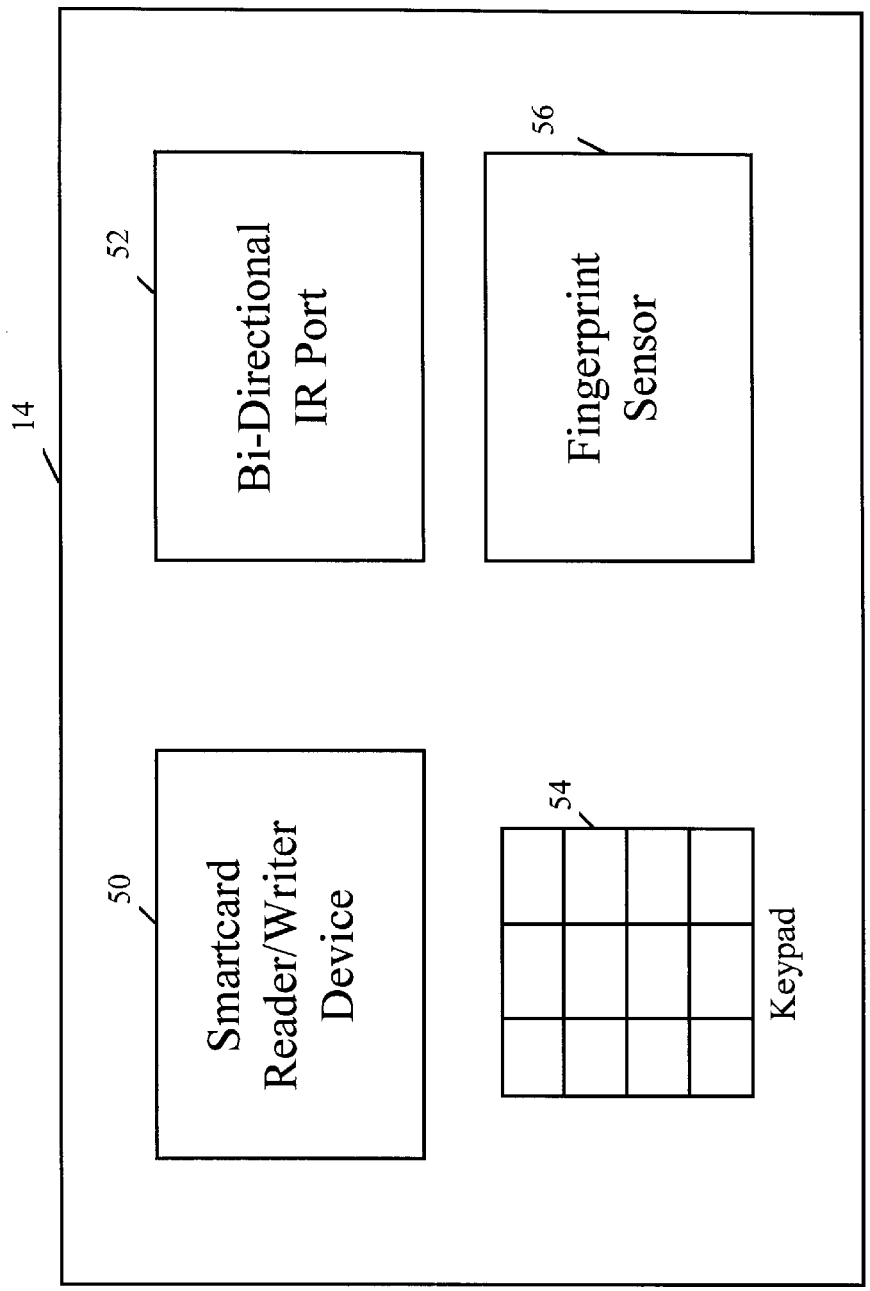
FIG. 4 is a schematic diagram which illustrates an example of key components for the service access device for an embodiment of the present invention.

In an embodiment of the present invention, the SAD 14 operates on a removable smart card that has, for example, magnetic stripes and can be used as a regular ATM card. The SAD 14 provides ATM transactions that do not require Touchscreen or Card Reader operations. The SAD 14 also provides transactions, including loading and discharge of smart card electronic money from all terminals with the SAD interface 32 and appropriate application support. In addition, the SAD 14 allows the owner to preprogram the SAD offline to perform single button operations online. Further, the SAD 14 controls the position of the terminal, such as disabled user ATM height adjustment, gas pump targeting, and the like. Further, SAD 14 is a low-cost device, which can be considered for a give-away approach. Additionally, SAD 14 simplifies access to ATM's, particularly by handicapped and disabled users of ATM and attracts new customers by its unique features FIG. 4 is a schematic diagram which illustrates an example of key components for the service access device (SAD) for an embodiment of the present invention. The SAD 14 includes components, such as a smart card reader/writer device 50, a bi-directional communication infrared (IR) port 52, a keypad 54, and an optional fingerprint sensor 56. The keypad 54 for the SAD 14 includes, for example, numeric keys to enter numbers, directional keys for terminal position control, and control keys to program the SAD and send commands to terminals. In order to work with the SAD 14, terminals are equipped with the SAD interface 32, including, for example, hardware, driver, and application components. In addition to other requirements, such as portability to all terminals that use the SAD 14, compatibility is provided with terminals that already have an IR interface.

In an embodiment of the present invention, the PPKE is also utilized in home banking. Home banking relies on general security protocols, if provided by the communication system. Incorporating the PPKE in home banking applications provides much needed bank internal security and creates an environment for the extension of such applications to include new services, such as electronic commerce 20 and smart card bi-directional operation. Electronic commerce 0 allows the customers of a financial institution, such as a bank, to engage in a customer-merchant relationship with the bank functioning as a type of clearinghouse. Adoption of the PPKE by other banks extends this relationship to customers and merchants who have accounts in different banks. Absent such adoption, the relationship is provided exclusively for customers of the particular bank and encourages Internet merchants to open accounts with the particular bank.

The customer-merchant relationship for an embodiment of the present invention can be initiated by either the customer or the merchant. In the relationship, the merchant plays the man-in-the-middle to avoid a triangular connection. The PPKE ensures that the merchant cannot decrypt customer-bank messages. In the end, all three sides, namely, the customer, the merchant, and the bank, have confirmation of their respective responsibilities. As an option, the transfer of funds from the customer to the merchant can be deferred until the bank receives the merchant's post office receipt and the bank notifies the customer, for example, by E-mail, of the completion of a transaction.

In an embodiment of the present invention, home banking devices 10 that are equipped with a smart card interface 32 and do not perform loading operations due to security considerations can perform loading operations with the PPKE protection. Other devices that do not have a smart card interface in order to operate with smart cards can use the SAD 14 directly or, if they are not IR-compatible, via the SAD interface 32. Smart card operations 40, include, for example, loading 42, 45 and discharging 44, 48 of electronic money. In the case of an interaction with the customer's bank account, such operations are analogous to withdrawing cash and making a deposit. Electronic money transactions can also be used in electronic commerce.

The PPKE and SAD 14 for an embodiment of the present invention are also utilized in implementing self-service devices, such as the NT CAT and Slim CAT 22 and the MiniCAT and MultiCAT 24. The appreciation of bank customers for fast service is clearly evidenced by their acclaim for the replacement of the UNICOM CAT by the NT CAT's. Compared with the speed of the SAD 14, this improvement is minor. The increase in speed with the SAD 14 is realized by simply equipping the CATs with the SAD interface 32 and installing the PPKE. Terminals enhanced by these features provide additional, express services, such as Express Cash and Express Card 34 for smart card loading and discharging 38.

Figure 5:
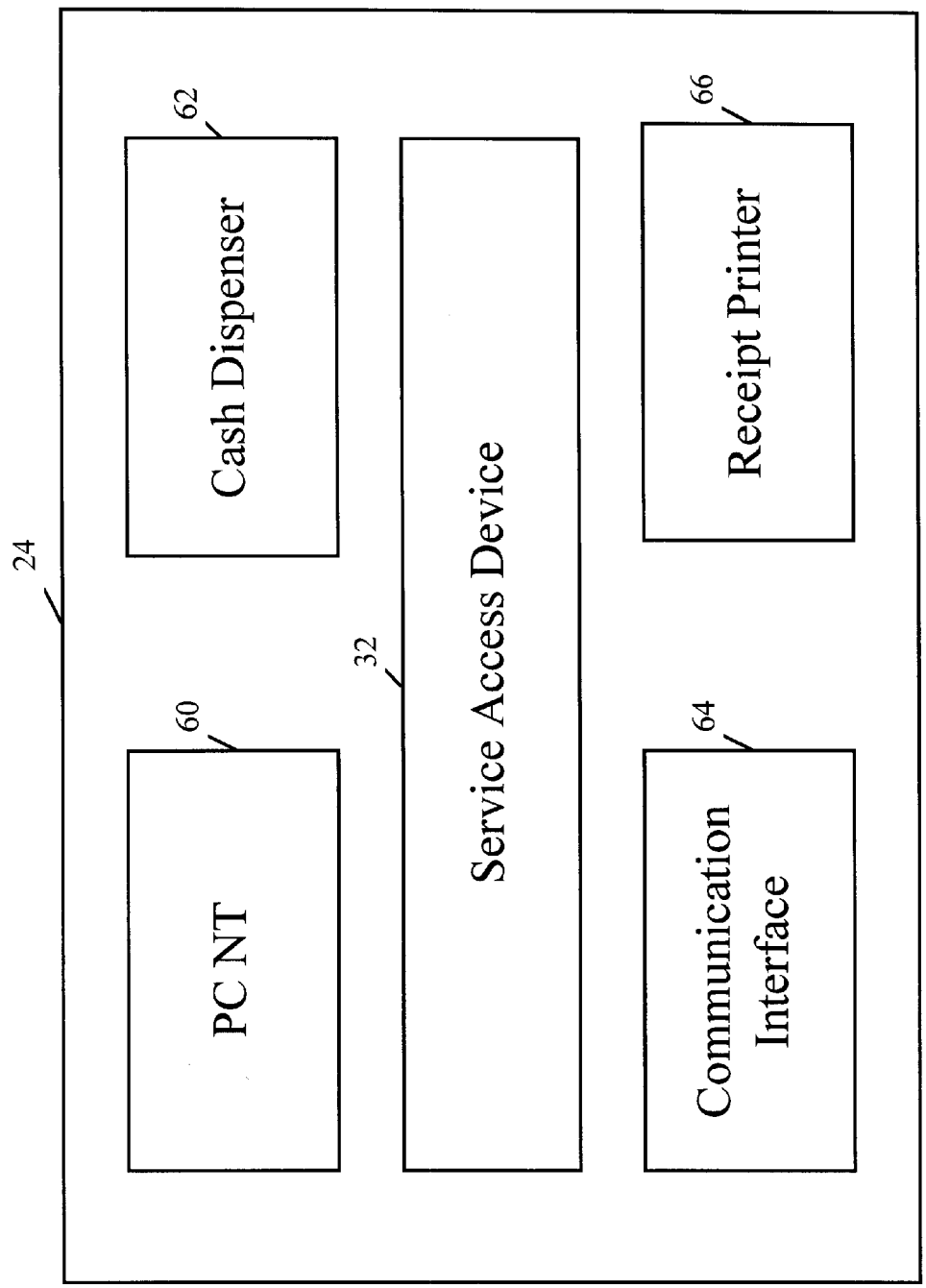
FIG. 5 is a schematic diagram which illustrates an example of key components for the MiniCAT for an embodiment of the present invention.

In an embodiment of the present invention, the MiniCAT 24 is a new class of low-cost, small-footprint ATM controlled exclusively by the SAD 14. FIG. 5 is a schematic diagram which illustrates an example of key components for the MiniCAT for an embodiment of the present invention. The MiniCAT 24 provides even faster service than the enhanced terminals because it is used exclusively by SAD 14. The services available through the MiniCAT 24 include, for example, Jet Cash and Jet Card 36 for smart card loading and discharging 38. MiniCAT terminals 24 are intended for the exclusive use by the customers of a particular bank. The MiniCAT 24 is inexpensive, and its components include, for example, PC NT 60, a cash dispenser 62, the SAD interface 32, a communication interface 64, and a receipt printer 66.

The MiniCAT 24 for an embodiment of the present invention is small and very lightweight; and because of its portability, consideration must be given to its installation to prevent easy removal. One solution is, for example, the MultiCAT 24, which groups several MiniCAT's 24 in one large safe. In order to reduce cost, the MultiCAT 24 can share the NT engine 60 resources to take advantage of its multitasking and multi-user features.

The foregoing is illustrative of a range of new and improved products and services utilizing the alternative encryption technique of the present invention and is not intended be exhaustive or to limit the scope of the present invention. Combining cash and Smart Card operations in the same card and in the same devices is in keeping with an ongoing trend in society and the industry, namely, the coexistence of cash and electronic money. The simplification of smart card handling gives a financial institution, such as a bank, the competitive edge in building alliances with other businesses in their areas of service to their mutual benefit and the attraction of new customers.

Various preferred embodiments of the invention have been described in fulfillment of the various objects of the invention. It should be recognized that these embodiments are illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of verifying identification of a user and securely establishing an encryption key for a communication between a verifying entity having knowledge of a first secret and the user having knowledge of a second secret, comprising;

generating a first output which is a function of the first secret and a first random number;

generating a second output which is a function of the second secret and a second random number;

generating a first key which is a transform of the first output that is infeasible to invert without the first secret and the second secret;

generating a second key which is a transform of the second output that is infeasible to invert without the first secret and the second secret;

generating a first encrypted output which is a function of the first secret and the first key;

generating a first verification value by decrypting the first encrypted output with the second key that indicates the equivalence of the first secret to the second secret;

generating a second encrypted output which is a function of the second key and one of either the first decrypted number, if the first decrypted number is equal to both of the first and second secrets, and a random number; and generating a second verification value which is the second encrypted output decrypted using the first key that indicates an equivalence of the first secret to the second secret and the first key to the second key.

2. The method of claim 1, wherein generating the first output further comprises sending an account number for the user.

3. The method of claim 2, wherein generating the first output further comprises receiving the account number by the verifying entity.

4. The method of claim 3, wherein the first secret comprises a pre-assigned personal identification number for the user related to the account number for the user and identified by the verifying entity.

5. The method of claim 4, wherein generating the first output further comprises identifying a pre-assigned prime for the user related to the account number for the user by the verifying entity.

6. The method of claim 5, wherein generating the first output further comprises generating the first random number by the verifying entity.

7. The method of claim 6, wherein generating the first output further comprises calculating the first output by the verifying entity by the equation $$A = PIN^X \mod p$$

where A is the first output, PIN is the first secret, X is the first random number, and p is the prime.

8. The method of claim 1, wherein generating the second output further comprises generating the second random number.

9. The method of claim 8, wherein generating the second output further comprises calculating the second output for the user by the equation $$B = PIN^Y \mod p$$

where B is the second output, PIN is the second secret, Y is the second random number, and p is the prime.

10. The method of claim 1, wherein generating the first key further comprises computing the first key for the user by the equation $$K = A^Y \mod p$$

where K is the first key, A is the first output, Y is the second random number, and p is the prime.

11. The method of claim 1, wherein generating the second key further comprises computing the second key by the verifying entity by the equation $$K = B^X \mod p$$

where K is the second key, B is the second output, X is the first random number, and p is the prime.

12. The method of claim 1, wherein generating the first encrypted output further comprises generating the first encrypted output for the user by the equation pad PIN with a random number $R$: $C = PIN, R$ encrypt C with K as the key: $F = E_K(C)$\ where PIN is the first secret, R is a random number, K is the first key, and F is the first encrypted output.

13. The method of claim 1, wherein generating the first encrypted output further comprises sending the second output and the first encrypted output to the verifying entity for the user.

14. The method of claim 1, wherein the first verification value further comprises a first decrypted number that is equal to both the first secret and the second secret only if the first secret is equal to the second secret.

15. The method of claim 14, wherein generating the first verification value further comprises generating the first verification value by the verifying entity by the equation decrypt F with K: $C = D^K(F)$ where F is the first encrypted output, K is the second key, and C is the first verification value.

16. The method of claim 15, wherein generating the second encrypted output further comprises generating the second encrypted output by the verifying entity by the equation if PIN not recognized in C generate random number M else pad PIN with a random number $r$: $M = PIN, r$ encrypt M with K as the key and $N = E_K(M)$ where PIN is the second secret, C is the first verification value, K is the second key, and N is the second encrypted output.

17. The method of claim 16, wherein generating the second encrypted output further comprises sending the second encrypted output to the user.

18. The method of claim 17, wherein the second verification value further comprises a second decrypted number that is equal to both the first secret and the second secret only if the first secret is equal to the second secret.

19. The method of claim 18, wherein generating the second verification value further comprises generating the second verification value for the user by the equation decrypt N with K: $M = D_K(N)$ if PIN is recognized in M verification true else verification false where N is the second encrypted output, K is the first key, and PIN is the first secret.

20. The method of claim 19, further comprising communicating with K as the secure encryption key between the user and the verifying entity.

21. The method of claim 1, wherein the verifying entity further comprises a financial institution.

22. The method of claim 21, wherein the financial institution further comprises a bank.

23. The method of claim 1, wherein the user further comprises a user at a terminal.

24. The method of claim 23, wherein the terminal further comprises a service access device.

25. The method of claim 24, wherein the service access device further comprises a service access device interface.

26. The method of claim 25, wherein the service access device further comprises a combined smart-automated teller machine card.

27. The method of claim 25, wherein the service access device further comprises an automated teller machine.

28. The method of claim 25, wherein the service access device further comprises a self-service terminal.

29. The method of claim 28, wherein the self-service terminal further comprises a self-service cash terminal.

30. The method of claim 28, wherein the self-service terminal further comprises a self-services gas pump terminal.

31. The method of claim 25, wherein the service access device further comprises a home banking terminal.

32. The method of claim 25, wherein the service access device further comprises an electronic commerce terminal.

33. The method of claim 25, wherein the service access device further comprises a smart card terminal.

34. The method of claim 25, wherein the service access device further comprises a merchant terminal.

35. The method of claim 25, wherein the service access device further comprises an infrared compatible terminal.

36. The method of claim 1, further comprising sending a communication encrypted with an encryption key established by the equivalence of the first key to the second key.

37. A system for verifying the identification of a user and securely establishing an encryption key for a communication between a verifying entity having knowledge of a first secret and the user having knowledge of a second secret, comprising:

means for generating a first output with is a function of the first secret and a first random number;

means for generating a second output which is a function of the second secret and a second random number;

means for generating a first key which is a transform of the first output that is infeasible to invert without the first secret and the second secret;

means for generating a second key which is a transform of the second output that is infeasible to invert without the first secret and the second secret;

means for generating a first encrypted output which is a function of the first secret and the first key;

means for generating a first verification value by decrypting the first encrypted output with the second key that indicates the equivalence of the first secret to the second secret;

means for generating a second encrypted output which is a function of the second key and one of either the first decrypted number, if the first decrypted number is equal to both of the first and second secrets, and a random number; and means for generating a second verification value which is the second encrypted output decrypted using the first key that indicates an equivalence of the first secret to the second secret and the first key to the second key.

38. The system of claim 37, wherein the means for generating the first output further comprises the equation $$A = PIN^X \bmod p$$

where A is the first output, PIN is the first secret, X is the first random number, and p is the prime.

39. The system of claim 37, wherein the means for generating the second output further comprises the equation $$B = PIN^Y \bmod p$$

where B is the second output, PEN is the second secret, Y is the second random number, and p is the prime.

40. The system of claim 37, wherein the means for generating the first key further comprises the equation $$K = A^Y \bmod p$$

where K is the first key, A is the first output, Y is the second random number, and p is the prime.

41. The system of claim 37, wherein the means for generating the second key further comprises the equation $$K = B^X \bmod p$$

where K is the second key, B is the second output, X is the first random number, and p is the prime.

42. The system of claim 37, wherein the means for generating the first encrypted output further comprises the equation pad PIN with a random number $R$: $C = PIN, R$ encrypt $C$ with $K$ as the key: $F = E_K(C)\backslash$ where PIN is the first secret, R is a random number, K is the first key, and F is the first encrypted output.

43. The system of claim 37, wherein the means for generating the first verification value further comprises the equation decrypt $F$ with $K$: $C = D_K(F)$ where F is the first encrypted output, K is the second key, and C is the first verification value.

44. The system of claim 43, wherein the means for generating the second encrypted output further comprises the equation if PIN not recognized in $C$ generate random number $M$ else pad PIN with a random number $r$: $M = PIN, r$ encrypt $M$ with $K$ as the key and $N = E_K(M)$ where PIN is the second secret, C is the first verification value, K is the second key, and N is the second encrypted output.

45. The system of claim 44, wherein the means for generating the second verification value further comprises the equation decrypt $N$ with $K$: $M = D_K(N)$ if PIN is recognized in $M$ verification true else verification false where N is the second encrypted output, K is the first key, and PIN is the first secret.

46. A method of verifying identification of a user and securely establishing an encryption key for a communication between a verifying entity having knowledge of a first secret and the user having knowledge of a second secret, comprising:

generating a first output by the verifying entity which is a function of the first secret and a first random number, the first secret comprising a pre-assigned personal identification number for the user related to an account number for the user, and the first output being calculated by the equation $$A = PIN^X \mod p$$

where A is the first output, PIN is the pre-assigned personal identification number, X is the first random number, and p is a pre-assigned prime related to the account number;

generating a second output by the user which is a function of the second secret and a second random number, the second secret comprising the pre-assigned personal identification number for the user, and the second output being calculated by the equation $$B = PIN^Y \mod p$$

where B is the second output, PIN is the second secret, Y is the second random number, and p is the pre-assigned prime;

generating a first key by the user which is a transform of the first output that is infeasible to invert without the first secret and the second secret;

generating a second key by the verifying entity which is a transform of the second output that is infeasible to invert without the first secret and the second secret;

generating a first encrypted output by the user which is a function of the first secret and the first key;

generating a first verification value by the verifying entity by decrypting the first encrypted output with the second key that indicates the equivalence of the first secret to the second secret;

generating a second encrypted output by the verifying entity which is a function of the second key and one of either the first decrypted number, if the first decrypted number is equal to both of the first and second secrets, and a random number; and generating a second verification value by the user which is the second encrypted output decrypted using the first key that indicates an equivalence of the first secret to the second secret and the first key to the second key.

* * * * *

UNITED STATES PATENT AND TRADEMARK OFFICE
CERTIFICATE OF CORRECTION

PATENT NO. : 6,848,050 B1
DATED : January 25, 2005
INVENTOR(S) : Merman et al.

It is certified that error appears in the above-identified patent and that said Letters Patent is hereby corrected as shown below:

Column 14,
Line 7, please change "$D^K (F)$" to -- $D_K (F)$ --

Column 15,
Line 25, please change "first output with" to -- first output that --
Line 66, please change "PEN" to -- PIN --

Signed and Sealed this

Fifth Day of July, 2005

JON W. DUDAS
*Director of the United States Patent and Trademark Office*